(12) United States Patent  
Cinquin et al.

(10) Patent No.: US 8,391,571 B2  
(45) Date of Patent: Mar. 5, 2013

(54) AUTOMATIC DETECTION OF A SURGICAL TOOL ON AN IMAGE PROVIDED BY A MEDICAL IMAGING SYSTEM

(75) Inventors: Philippe Cinquin, Saint Nazaire les Eymes (FR); Sandrine Voros, Grenoble (FR)

(73) Assignee: Universite Joseph Fourier, Grenoble Cedex (FR)

( * ) Notice: Subject to any disclaimer, the term of this patent is extended or adjusted under 35 U.S.C. 154(b) by 972 days.

(21) Appl. No.: 12/279,948

(22) PCT Filed: Feb. 16, 2007

(86) PCT No.: PCT/FR2007/050816  
§ 371 (c)(1),  
(2), (4) Date: May 5, 2009

(87) PCT Pub. No.: WO2007/096557  
PCT Pub. Date: Aug. 30, 2007

(65) Prior Publication Data  
US 2009/0220131 A1    Sep. 3, 2009

(30) Foreign Application Priority Data  
Feb. 20, 2006 (FR) ...................................... 06 50591

(51) Int. Cl.  
    *G06K 9/00* (2006.01)
(52) U.S. Cl. ....................................................... 382/128
(58) Field of Classification Search .................... 382/128  
    See application file for complete search history.

(56) References Cited

U.S. PATENT DOCUMENTS

| | | | | |
|---|---|---|---|---|
| 5,649,021 A | * | 7/1997 | Matey et al. | 382/128 |
| 6,806,899 B1 | * | 10/2004 | Schaack | 348/65 |
| 7,440,793 B2 | * | 10/2008 | Chauhan et al. | 600/424 |
| 2005/0282175 A1 | * | 12/2005 | Taylor et al. | 435/6 |

OTHER PUBLICATIONS

Wei, G. et al., "Real-Time Visual Servoing for Laparoscopic Surgery. Controlling Robot Motion with Color Image Segmentation", IEEE Engineering in Medicine and Biology, pp. 40-45, 1997.

Faugeras, O. "Three Dimensional Computer Vision—A Geometric Viewpoint", d'Olivier Faugeras series: Artificial Intelligence, the MIT Press, Cambridge Massachussets, 1993, ISBN 0-262-06158-9 (chapter 3, pp. 33-68).

Coste, E. "Reconstruction d'une arborescence spatiale a partir d'un nombre minimal de projections: application a l'angiographie numerisee des structures vasculairs", Chap. 1, Section III, Annex 4, 1996. (with two relevant translations attached-Chapter 1, section 3 and Annex 4).

Cocquerez, J.-P. et al., "Analyse d-images: filtrage et segmentation", ISBN 2-225-84923-4, 1995. (with relevant translation attached).

(Continued)

*Primary Examiner* — Georgia Y Epps  
*Assistant Examiner* — Jerry Brooks  
(74) *Attorney, Agent, or Firm* — Howard IP Law Group, P.C.

(57) ABSTRACT

A device for detecting a surgical tool in an image, the surgical tool going through an incision made in a patient's skin or one of his organs, the device including: means for storing shape parameters of the surgical tool. means for determining the position of the projection of the incision in the image plane and means for determining points and/or straight lines characteristic of the projection of the surgical tool on the image based on the shape parameters and on the position of the projection of the incision.

15 Claims, 2 Drawing Sheets

OTHER PUBLICATIONS

Duda, R. O. et al., "Use of the Hough Transformation to Detect Lines and Curves in Pictures", Communications of the ACM, vol. 15(1), pp. 11-15, 1972.

Otsu, N. "A threshold selection method from gray level histograms", IEEE Trans. Systems, Man and Cybernetics, vol. 9, pp. 62-66, 1979.

Doignon et al., "Real-Time Segmentation of Surgical Instruments Inside the Abdominal Cavity Using a Joint Hue Saturation Color Feature", Real-Time Imaging, Academic Press Limited, vol. 11, No. 5-6, Oct. 2005, pp. 429-442.

Windisch et al., "Bayesian Differentiation of Multi-Scale Line-Structures for Model-Free Instrument Segmentation in Thoracoscopic Images", Second International Conference on Image Analysis and Recognition, Sep. 28, 2005, pp. 938-948.

Lee et al., "Image Analysis for Automated Tracking in Robot-Assisted Endoscopic Surgery", Pattern Recognition Conference A: Computer Vision & Image Processing, Proceedings of the 12th IAPR International Conference on Jerusalem Oct. 1994, vol. 1, pp. 88-92).

Wei et al., "Real-Time Visual Servoing for Laparascopic Surgery: Controlling Robot Motion With Color Image Segmentation", IEEE Engineering in Medicine and Biology Magazine, vol. 16, No. 1, Jan. 1997, pp. 40-45.

European Search Report, Dated Aug. 3, 2007.

\* cited by examiner ic tools is performed in real time.
AUTOMATIC DETECTION OF A SURGICAL TOOL ON AN IMAGE PROVIDED BY A MEDICAL IMAGING SYSTEM This application is the national stage application under 35 U.S.C. §371 of the International Application No. PCT/FR2007/050816 and claims the benefit of Int'l Application No. PCT/FR2007/050816, filed Feb. 16, 2007 and French Application No. 06/50591, filed Feb. 20, 2006, the entire disclosures of which are incorporated herein by reference in their entireties.

FIELD OF THE INVENTION

The present invention relates to computer-assisted surgical interventions in which the surgeon performs the intervention with the assistance of images provided by a medical imaging system. The present invention more specifically relates to the automatic detection of surgical tools in the images provided by the medical imaging system.

DISCUSSION OF PRIOR ART

In a laparoscopic surgical intervention, a patient's abdominal cavity is inflated by means of carbon dioxide. Small incisions are made on the abdominal wall and a trocart is introduced into each incision. The number of incisions depends on the type of envisaged intervention and generally varies from 2 to 5. Each trocart corresponds to a tight hollow tube in which a surgical tool is likely to slide. An endoscope and surgical tools are introduced into the abdominal cavity through the trocarts. The image provided by the endoscope is received by a camera and displayed on a display screen. During the surgical intervention, an assistant moves the endoscope according to the instructions given by the surgeon. By means of the video image provided by the camera linked to the endoscope, the surgeon manipulates the surgical tools in the abdominal cavity according to the intervention to be performed.

An advantage of a laparoscopic surgical intervention is that it is only very slightly traumatic for the patient since the performed incisions are small. However, the surgeon does not directly see the ends of the surgical tools located in the abdominal cavity and only has the video image provided by the camera linked to the endoscope to perform the intervention. A laparoscopic surgical intervention thus requires for the surgeon to be very experienced.

Positioning systems may be used instead of an assistant to move the endoscope. An example of such a system is the positioning tool sold by Computer Motion Company under trade name Aesop or the positioning system sold by Armstrong Healthcare Company under trade name EndoAssist. Such positioning systems can be controlled by the surgeon by means of a man/machine interface, for example, a pedal board, a voice control system, or a control system based on the detection of the motions of the surgeon's head. As an example, following voice commands such as "left", "right", "up", "down", the positioning system may displace the end of the endoscope in the abdominal wall respectively to the left, to the right, upwards or downwards.

A disadvantage of such positioning systems is that only elementary controls corresponding to simple displacements of the endoscope are generally available. The surgeon must then provide frequent displacement commands to the endoscope positioning system, for example to follow the displacements of a specific surgical tool, while simultaneously handling the surgical tools, which is a big constraint. It would be desirable to be able to control the displacements of the endoscope positioning system with more complex instructions. It would for example be advantageous for the surgeon to be able to designate a specific surgical tool, which would cause the automatic displacement of the endoscope toward the designated tool. The surgeon would then no longer have to regularly provide new displacement commands to the endoscope positioning system and would be free to fully dedicate himself to the intervention. To implement such displacement commands, a possibility is to automatically determine the positions of the surgical tools on the video image provided by the camera linked to the endoscope. The endoscope positioning system can then be automatically controlled based on the determined positions of the surgical tools and, for example, on an initial command given by the surgeon.

Wei et al.'s publication, entitled "Real-Time Visual Servoing for Laparoscopic Surgery. Controlling Robot Motion with Color Image Segmentation", IEEE Engineering in Medicine and Biology, pages 40-45, 1997, describes a method for controlling the displacements of an endoscope positioning system based on the determination of the position of a surgical tool on a video image in which the tool bears a tracer dye. The detection of the tracer dye allows determining the position of the tool on the video image. A disadvantage of such a method is that it is necessary to modify the surgical tool to apply a tracer dye thereto, which adds a significant cost. Further, the tool detection is impossible as soon as the associated tracer dye is no longer visible on the video image.

SUMMARY OF THE INVENTION

The present invention aims at overcoming all or part of the previously-mentioned disadvantages.

More specifically, the present invention aims at a method and a device for detecting surgical tools on images provided by a medical imaging system which requires no modification of the surgical tools conventionally used in a surgical intervention.

According to another object of the present invention, the detection of the surgical tools is performed in real time.

To achieve these objects, the present invention provides a device for detecting a surgical tool in an image, said surgical tool going through an incision made in a patient's skin or one of his organs, the device comprising means for storing shape parameters of the surgical tool; means for determining the position of the projection of the incision in the image plane; and means for determining points and/or straight lines characteristic of the projection of the surgical tool on the image based on the shape parameters and on the position of the projection of the incision.

According to an embodiment of the present invention, the device comprises means for acquiring first and second images of the incision; means for determining a first position of a point of the projection of the incision on the first image and a second position of said point on the second image; and means for determining the position of said point with respect to the patient from the first and second positions.

According to an embodiment of the present invention, the surgical tool has an elongated shape, the lateral edges of the projection of the tool in the image plane corresponding to straight lines, the means for determining the characteristic points and/or straight lines being capable of determining a set of pixels of the image such that, for each pixel in the set of pixels, the gradient of a function which depends on the pixel color is greater than a threshold; and selecting each pixel for which the straight line crossing the pixel and perpendicular to the gradient runs at the level of the projection of the incision in the image plane.

According to an embodiment of the present invention, the means for determining the characteristic points and/or straight lines is capable of determining the axis of symmetry of the projection of the surgical tool on the image from the selected pixels; determining the pixels of the axis of symmetry belonging to the projection of the tool on the image; and determining the pixel of the axis of symmetry corresponding to the end of the tool.

According to an embodiment of the present invention, the means for determining characteristic points and/or straight lines is capable of determining, from among the selected pixels, the set of pixels such that, for each pair of pixels in the set of pixels, the perpendicular bisector of the pair runs at the level of the projection of the incision in the image plane; classifying the perpendicular bisectors in groups of adjacent perpendicular bisectors; and determining the axis of symmetry from the group of perpendicular bisectors containing the largest number of perpendicular bisectors.

According to an embodiment of the present invention, the means for determining characteristic points and/or straight lines is capable of assigning to each pixel of the axis of symmetry a color class from a first or a second color class; selecting a first group of adjacent pixels containing the largest number of adjacent pixels of the first color class and a second group of adjacent pixels containing the largest number of adjacent pixels of the second color class; and selecting, from among the first or the second group of pixels, the pixel group closest to the projection of the incision in the image plane.

The present invention also provides a device for controlling a positioning system of means for acquiring images of a patient in whom at least one incision has been made to let through a tool, the control device comprising means for providing instructions transmitted by a user; a detection device such as defined previously; and means for providing control signals to the positioning system based on the points and/or straight lines characteristic of the surgical tool provided by the detection device and on the instructions provided by the means for providing instructions.

According to an embodiment of the present invention, the image acquisition means comprises an endoscope and a camera.

The present invention also provides a method for detecting a surgical tool in an image, said tool going through an incision made in a patient's skin or in one of his organs, the method comprising the steps of storing shape parameters of the surgical tool; determining the position of the projection of the incision in the image plane; and determining points and/or straight lines characteristic of the projection of the surgical tool on the image based on shape parameters and on the position of the projection of the incision.

According to an embodiment of the present invention, the surgical tool has an elongated shape, the lateral edges of the projection of the tool in the image plane corresponding to straight lines, the method further comprising the steps of determining a set of pixels of the image so that, for each pixel in the set of pixels, the gradient of a function which depends on the pixel color is greater than a threshold; and selecting each pixel for which the straight line crossing the pixel and perpendicular to the gradient runs at the level of the projection of the incision in the image plane.

BRIEF DESCRIPTION OF THE DRAWINGS

The foregoing and other objects, features, and advantages of the present invention will be discussed in detail in the following non-limiting description of a specific example in connection with the accompanying drawings, among which.

DETAILED DESCRIPTION

Figure 1:
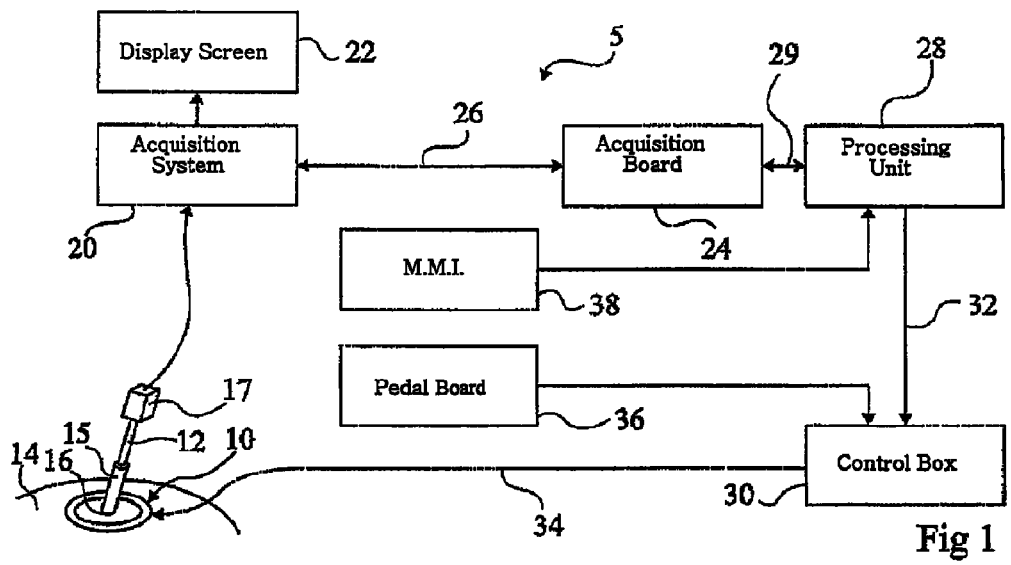
FIG. 1 schematically shows an example of a system for controlling an endoscope positioning system implementing the surgical tool detection method according to the present invention.

For clarity, the same elements have been designated with the same reference numerals in the different drawings.

The present invention is based on the fact that for certain surgical interventions, for example, a laparoscopy, the introduction of surgical material at the level of a vertebra, etc., a surgical tool is introduced into the patient's body through a small incision. The present invention thus provides detecting such a surgical tool on the images provided by a medical imaging system, considering that the tool necessarily goes through the incision, which has a position that can be determined previously, and that the shape of the tool is known. This eases the tool detection on the images so that a detection can be performed automatically and in real time.

FIG. 1 shows an embodiment of a device 5 for controlling a system 10 for positioning an endoscope 12, implementing the surgical tool detection method according to the present invention. For a laparoscopy, positioning system 10 is placed on abdomen 14 of a patient whose abdominal cavity has been filled with gas. Positioning system 10 holds a trocart 15 containing endoscope 12 and penetrating into the abdominal cavity through an incision 16. A camera 17 is attached to the end of endoscope 12 within the abdominal cavity. Positioning system 10 is of the type enabling a displacement of trocart 15 and of endoscope 12 according to a number of degrees of freedom, for example, one degree of freedom for translation and two degrees of freedom for rotation.

The images obtained by camera 17 are transmitted to an image acquisition system 20 capable of displaying video images on a display screen 22. Acquisition system 20 is connected to an acquisition board 24 via a connection 26, for example, an S-VIDEO cable. Acquisition board 24 is connected to a processing unit 28, for example, a computer, via a connection 29, for example, a Fire-Wire cable (IEEE 1394 cable). Acquisition board 24 preprocesses the video images which are transmitted to processing unit 28. Processing unit 28 is capable, as will be explained in further detail hereafter, of analyzing the video images to detect the presence of surgical tools on the images.

Processing unit 28 is further capable of transmitting displacement commands to a control box 30 via a connection 32. Control box 30 is capable of translating the displacement commands transmitted over connection 32 into control signals for positioning system 10 and of transmitting the control signals to positioning system 10 via a connection 34. The surgeon can activate or deactivate control box 30 via a pedal board 36. Further, the surgeon can provide instructions to processing unit 28 via a man/machine interface 38 which may comprise a voice control system and/or a system for detecting the motions of the surgeon's head.

Figure 2:
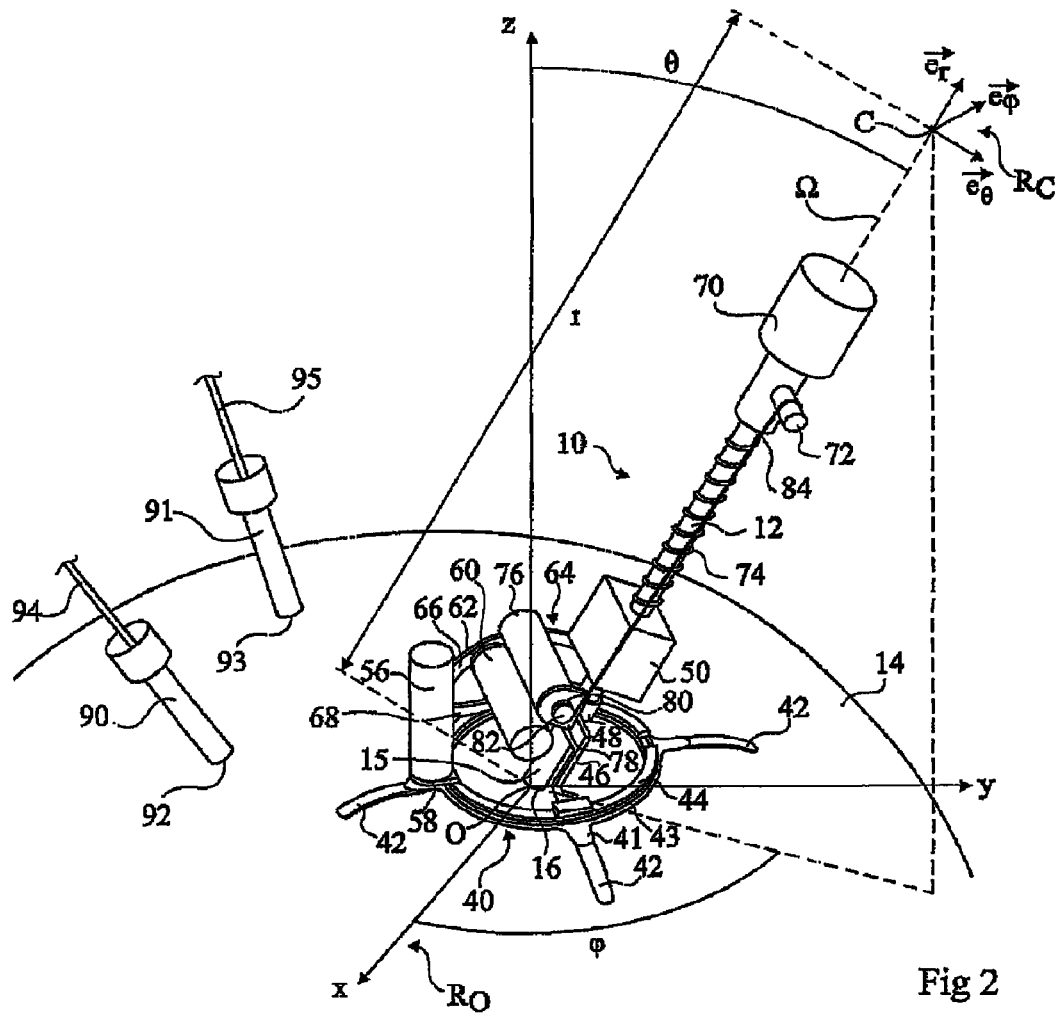
FIG. 2 schematically shows an embodiment of the positioning system of FIG. 1.

FIG. 2 shows a more detailed embodiment of positioning system 10. It for example is the positioning system described in publication WO 03/094759 issued to PRAXIM. Endoscope 12 has the aspect of a cylindrical tube of axis Ω of some forty centimeters long, with a diameter of a few centimeters. Axis Ω for example corresponds to the optical axis of endoscope 12 and of camera 17. Camera 17 is not shown in FIG. 2.

Positioning system 10 comprises a substantially planar base 40 comprising a ring-shaped planar central portion 41, surrounding incision 16, from which four arms 42 extend. Positioning system 10 may be attached by straps connected to arms 42. Base 40 may also be glued on the patient's abdomen 14. A fixed ring 43 is arranged on ring-shaped base 41. Fixed ring 43 is solid with base 41. A mobile ring 44 of axis (Oz), substantially perpendicular to the plane tangent to abdomen 14 at the level of incision 16 is rotatably assembled on fixed ring 43 around axis (Oz). Fixed ring 43 comprises peripheral teeth, not shown, on its external lateral surface.

A stirrup 46 is pivotally assembled on mobile ring 44 along an axis substantially perpendicular to axis (Oz) and comprised in the plane tangent to abdomen 14 at the level of incision 16. Trocart 15 is held on stirrup 46 by a mounting clip 48, for example screwed on stirrup 46, which enables simple and fast connection and separation of trocart 15 and of stirrup 46. Trocart 15 comprises a protrusion 50 located on the side of mounting clip 48 opposite to central portion 41. Protrusion 50 may correspond to handles, sealing valves, connectors, etc. The inner diameters of mobile ring 44 and of central ring-shaped portion 41 are selected to enable retrieval of system 10 during an intervention without displacing trocart 15, or to enable retrieval of trocart 15 from the patient's abdomen without displacing system 10.

A first electric motor 56, intended to rotate mobile ring 44 with respect to fixed ring 43, is immovably assembled to mobile ring 44 via a plate 58. First motor 56 is connected to control box 30, not shown in FIG. 2. A toothed wheel, not visible in FIG. 2, driven by the shaft of first motor 56, meshes with the teeth of fixed ring 43. The rotating of the toothed wheel by first motor 56 causes the rotating of mobile ring 44 with respect to fixed ring 43 around axis (Oz).

A second electric motor 60 is attached to stirrup 46, on the side of stirrup 46 opposite to mounting clip 48, via a plate 62. The shaft of second motor 60, not visible in FIG. 2, is oriented along the swivel axis of stirrup 46. Plate 62 comprises an opening letting through the shaft of second motor 60, not visible in FIG. 2. Second motor 60 is connected to control box 30. A driving element 64 comprises a circular arc 66 having its ends connected by a rectilinear portion 68 attached to mobile ring 44. Driving element 64 substantially extends in a plane perpendicular to the plane containing mobile ring 44. The axis of circular arc 66 corresponds to the swivel axis of stirrup 46. The lateral wall of circular arc 66 opposite to rectilinear portion 68 comprises teeth (not shown). The shaft of second motor 60 supports a toothed wheel (not shown) which cooperates with the teeth of circular arc 66 so that, when the toothed wheel is rotated by second motor 60, stirrup 46 is pivotally driven with respect to mobile ring 44.

The free end of endoscope 12 comprises a cylindrical stop 70 from which a pin 72 projects. A compression ring 74 bears at one end on cylindrical stop 70 and at the other end on protrusion 50 of trocart 15. A third electric motor 76 is attached to stirrup 46, next to second motor 60, via a plate 78. Plate 78 comprises an opening 80 letting through the shaft, not visible in FIG. 2, of third motor 76. The shaft of third motor 76 is oriented along the swivel axis of stirrup 46. Third motor 76 is connected to control box 30. A winding shaft or cylinder 82 is arranged at the free end of the shaft of third motor 76. A helical threading (not shown) is formed on the external surface of winding cylinder 82. A cable 84 is connected at its ends to pin 72 and to cylinder 82 and is wound around cylinder 82. When third motor 76 rotates cylinder 82, cable 84 winds around cylinder 82 and brings cylindrical stop 70 closer to trocart 15. Endoscope 12 then slides in trocart 15 along axis Ω and compresses spring 74. When third motor 76 is no longer actuated, spring 74 expands and brings endoscope 12 back to a position of rest. A supporting arm, oriented by the surgeon before the beginning of the operation, may be provided to support positioning system 10 and avoid for all the weight of positioning system 10 to be applied on the patient.

The previously-described positioning system 10 enables displacing endoscope 12 according to two degrees of freedom for rotation and one degree of freedom for translation based on control signals provided by control box 30 to electric motors 56, 60, 76.

Additional trocarts 90, 91 are arranged at the level of incisions 92, 93 of small dimensions made in the patient's abdominal wall 14. Additional trocarts 90, 91 enable introducing surgical tools 94, 95, partially shown in FIG. 2, into the abdominal cavity.

In the following description, call $R_O$ (O,x,y,z) a frame of reference, for example, orthonormal, having its origin O for example corresponding to the "fixed point" of positioning system 10, that is, the intersection point between the rotation axis of mobile ring 44 and the rotation axis of stirrup 46. Axes (Ox) and (Oy) correspond to two perpendicular axes, also perpendicular to axis (Oz) which, as described previously, is perpendicular to abdominal wall 14 at the level of incision 16. Reference frame $R_O$ is considered as fixed with respect to the patient during the surgical intervention. Camera 17 and endoscope 12 are, in operation, fixed with respect to each other. Call C a fixed point with respect to camera 17, located on axis Ω, at a distance r from point O. Angle θ corresponds to the angle between axis Ω and axis (Oz) and angle φ corresponds to the angle between the projection of axis Ω in plane (Oxy) and axis (Ox). The coordinates of point C in reference frame $R_O$ are (r sin θ cos φ, r sin θ sin φ, r cos θ).

Call $R_C$ (C, $\bar{e}_r$, $\bar{e}_\theta$, $\bar{e}_\phi$) the spherical reference frame associated with point C. Reference frame $R_C$ is a fixed reference frame with respect to camera 17. Note (X, Y, Z) the coordinates of any point P expressed in reference frame $R_O$ and (l, m, n) the coordinates of point P expressed in reference frame $R_C$. Before the surgical intervention, a step of calibration of positioning system 10 which comprise determining the transfer array providing coordinates (l, m, n) of point P from coordinates (X, Y, Z) and the relation between the displacement commands provided by processing unit 28 to control box 30 and the variation of parameters r, θ, and φ. During the surgical intervention, processing unit 28 is then capable of determining at any time the position of reference frame $R_C$ with respect to reference frame $R_O$ based on the displacement commands provided to control box 30. It should be clear that reference frames $R_O$ and $R_C$ could be defined differently from what has been described previously. The only condition is to be able to consider reference frame $R_O$ as fixed with respect to the patient during the intervention, to be able to consider reference frame $R_C$ as fixed with respect to the camera during the intervention, and to be able to determine the position of reference frame $R_C$ with respect to reference frame $R_O$ at any time.

Figure 3:
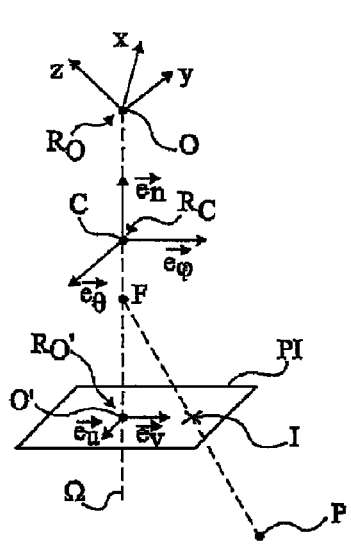
FIG. 3 illustrates the relation between the position of a point in space and the projection of this point on the image plane of a camera.

In FIG. 3, reference frames $R_O$ and $R_C$ have been schematically shown with their origins O and C located on optical axis Ω of endoscope 12. Camera 17 is considered as operating according to a pinhole camera model. Such a camera model is described, for example, in the work entitled "Three Dimensional Computer Vision—A Geometric Viewpoint" by Olivier Faugeras, series: Artificial Intelligence, the MIT Press, Cambridge Mass., ISBN 0-262-06158-9 (chapter 3). Camera 17 can then be represented by a projection center F and an image plane PI. Image plane PI corresponds to the plane in which the images obtained by camera 17 and transmitted to acquisition system 20 are formed. Image plane PI and projection center F are fixed with respect to reference frame $R_C$. Any point P in space projects in image plane PI to form a point I. A two-dimensional reference frame $R_O'(O', \bar{e}_u, \bar{e}_v)$ is associated with image plane PI, where O' corresponds, for example, to the point of image plane PI on optical axis $\Omega$, and the coordinates of point I in reference frame $R_O'$ are called (u, v).

Before the surgical intervention, a step of calibration of camera 17 is provided. This comprises defining the transfer array which provides coordinates (u, v) of point I expressed in reference frame $R_O'$ based on coordinates (l, m, n) of point P expressed in reference frame $R_C$. According to the pinhole model, point I corresponds to the point of intersection of image plane P and of the straight line crossing point P and projection center F. The transfer array is obtained from the coordinates of point F and the equation of image plane PI expressed in reference frame $R_C$, which depend on the specifications of the used camera 17. Other camera models may be used.

After the steps of calibration of positioning system 10 and of camera 17, processing unit 28 can determine, for a point P having coordinates (X, Y, Z) in fixed reference frame $R_O$ which have been determined previously and stored in processing unit 28, coordinates (u, v) of point I, which is the projection of point P in image plane PI, whatever the position of camera 17 in reference frame $R_O$.

Figure 4:
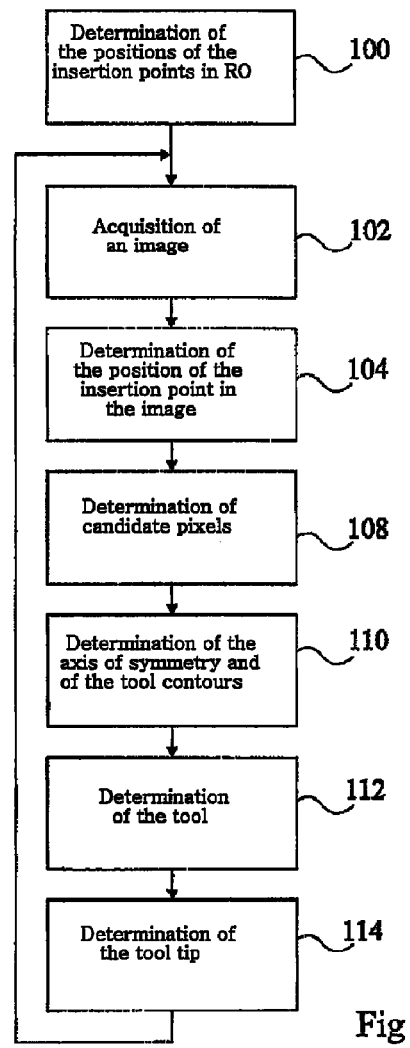
FIG. 4 shows an example of steps of the method for detecting surgical tools according to the present invention.

FIG. 4 illustrates the steps of an example of a method according to the present invention for detecting surgical tools on an image provided by camera 17, implemented by processing unit 28.

The surgeon is assumed to have made incisions 16, 92, 93 in the patient's abdominal wall 14, to have placed trocarts 15, 90, 91 in the corresponding incisions, to have introduced endoscope 12 into trocart 15 and to have arranged positioning system 10 on the patient's abdominal wall 14. Further, the steps of calibration of positioning system 10 and of camera 17 have been completed. Moreover, an identifier, for example, a number, has been stored in processing unit 28 for each incision-tool pair. Finally, the radius of each tool 94, 95, assumed to be cylindrical, is stored in processing unit 28.

At step 100, the positions of incisions 92, 93 in reference frame $R_O$ are determined. For each incision 92, 93, the position of a point located substantially at the "center" of the incision, or incision point, is determined in reference frame $R_O$. Determining the incision points may be done by any method. As an example, for each incision 92, 93, the surgeon may order the displacement of camera 17 to obtain two images of incision 92, 93 at different positions of camera 17. For each obtained image, the surgeon may indicate to processing unit 28 the position of the projection of the insertion point on the image displayed on screen 22 via interface 38, that is, indicate the position of the projection of the insertion point in reference frame $R_O'$. As an example, the surgeon may displace a tag on the image displayed on screen 22 to the position of the projection of the insertion point. Based on the positions of the projections of the insertion point on two different images, processing unit 28 may determine the position of the insertion point in reference frame $R_O$. This may be done according to the method described in the publication entitled "Reconstruction d'une arborescence spatiale à partir d'un nombre minimal de projections: application à l'angiographie numérisée des structures vasculaires", thesis by Eric Coste for his doctorate in productics, automatic control engineering, and industrial data processing of the Lille University of Science and Technologies (1996), especially chapter 1, section III, and appendix 4. Step 100 is repeated for each incision 92, 93. The previously-described method for determining the insertion points is particularly advantageous since it requires no additional instruments with respect to those conventionally used during the surgical intervention. According to another insertion point determination method, the position of each insertion point in reference frame $R_O$ may be obtained via a feeler having its position in reference frame $R_O$ provided by a tracking system. The position of each insertion point in reference frame $R_O$ is stored in processing unit 28. The actual surgical intervention then starts and the method carries on at step 102.

At step 102, processing unit 28 receives, via acquisition system 24, an image provided by camera 17.

Figure 5:
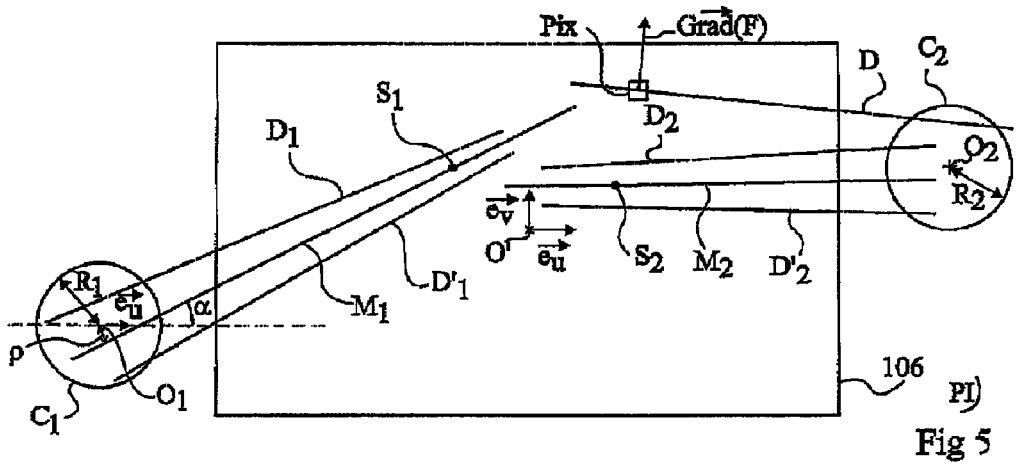
FIG. 5 schematically shows the concept of the surgical tool detection method according to the present invention.

FIG. 5 schematically shows an image 106 such as displayed on screen 22. Continuous line 106 corresponds to the physical limit of the image provided by camera 17. Image 106 thus corresponds to a portion of image plane PI of camera 17. Each image is formed of a pixel array. As an example, a pixel Pix has been shown in the form of a square portion of image 106. The method carries on at step 104.

At step 104, processing unit 28 determines the position, in image plane PI, of the projection of the insertion point of the searched tool or the projections of the insertion points of the searched tools. In FIG. 5, points $O_1$ and $O_2$ correspond to the projections, in plane PI, of the insertion points associated with incisions 92, 93 and will be called projected insertion points hereafter. In the present example, projected insertion points $O_1$ and $O_2$ are outside of the image provided by camera 17, and incisions 92, 93 are not visible on image 106. For each projected insertion point $O_1$, $O_2$, processing unit 28 determines a circle $C_1$, $C_2$ having its center corresponding to point $O_1$, $O_2$, and having its radius $R_1$, $R_2$ depending on the considered point $O_1$, $O_2$. As an example, radius $R_1$, $R_2$ substantially corresponds to the apparent radius of tool 94, 95 associated with the considered projected insertion point if the tool were parallel to image plane PI. The method carries on at step 108.

At step 108, processing unit 28 determines for each pixel of image 106 whether the pixel is likely to belong to the contour of the projection of a surgical tool 94, 95. For this purpose, the present invention is based on the fact that each surgical tool 94, 95 necessarily involves an incision 92, 93 and that the shape of each surgical tool 94, 95 is known. In the present embodiment, each cylindrical tool 94, 95 is considered as having an elongated cylindrical shape.

Processing unit 28 determines the contours present in the image by segmentation, according to a gradient method. The gradient method for images in grey levels is described in the work entitled: "Analyse d'images: filtrage et segmentation", which is a collective work coordinated by J.-P. Cocquerez and S. Phillip, with authors Ph. Bolon, J.-M. Chassery, J.-P. Cocquerez, D. Demigny, C. Graffigne, A. Montanvert, S. Phillip, R. Zéboudj, J. Zérubia, published by Masson, 1995, ISBN: 2-225-84923-4. For an image in grey levels, calling F the function which puts in correspondence with each pixel of position (u, v) the grey level of the pixel, a gradient vector $\overrightarrow{\text{Grad}(F(u,v))}$ which is normal to the contour at position (u,v) (pixel position) and which has a norm which is all the higher as the contour is "sharp", is obtained for each image pixel. For a color image, it is possible to break down the color image into three images in grey levels (an image R for red, an image G for green, and an image B for blue). For each pixel of coordinates (u,v), three gradient vectors $\overrightarrow{\text{Grad}}(R(u,v))$, $\overrightarrow{\text{Grad}}(G(u,v))$, $\overrightarrow{\text{Grad}}(B(u,v))$, respectively associated with image R, with image G, and with image B, can then be defined. The pixel gradient $\overrightarrow{\text{Grad}}(F(u,v))$ (or $\overrightarrow{\text{Grad}}(F)$) is then defined as being the maximum of the three gradient vectors $\overrightarrow{\text{Grad}}(R(u,v))$, $\overrightarrow{\text{Grad}}(G(u,v))$, $\overrightarrow{\text{Grad}}(B(u,v))$. Processing unit 28 only considers the pixels of image 106 for which the amplitude of gradient $\overrightarrow{\text{Grad}}(F)$ is greater than a determined threshold. Such pixels are likely to correspond to a transition between two objects of image 106, for example, organs, tools, etc. As an example, the gradient vector $\overrightarrow{\text{Grad}}(F)$ associated with pixel Pix has been shown in FIG. 5.

For such pixels, processing unit 28 determines whether the straight line crossing the pixels and perpendicular to gradient $\overrightarrow{\text{Grad}}(F)$ cuts one of circles $C_1$, $C_2$. If such a condition is fulfilled, the pixel is likely to belong to the edge of the projection of one of surgical tools 94, 95 and is called potential pixel hereafter. The previous condition translates as the fact that the searched surgical tool 94, 95 has a cylindrical shape, that is, the edges of the projection of the tool on image 106 must correspond to straight lines, and that surgical tool 94, 95 goes through an incision 92, 93, that is, the edges of the projection of the tool must run through a projected insertion point $O_1$, $O_2$. In the example of FIG. 5, straight line D perpendicular to gradient $\overrightarrow{\text{Grad}}(F)$ of pixel Pix cuts circle $C_2$. Processing unit 28 deduces therefrom, at this step of the method, that pixel Pix perhaps belongs to the edge of the projection of the surgical tool associated with projected insertion point $O_2$. A set of potential pixels is finally obtained. Unit 28 then implements various processings to decrease the number of potential pixels. As an example, the potential pixels which are isolated from other potential pixels and which obviously do not belong to the edges of the projection of a surgical tool can be eliminated. At the end of step 108, relatively dense sets of potential pixels, called candidate pixels, each roughly having a rectilinear elongated shape, are obtained. The method carries on at step 110.

At step 110, processing unit 28 determined the axis of symmetry M1, M2 of the projection of each tool 94, 95 on image 106. Indeed, since each tool is cylindrical, the edges of the projection of the tool correspond to two straight lines D1, D1', D2, D2', which thus have an axis of symmetry. It should be noted that axis of symmetry M1, M2 of the projection of a tool does not correspond, except in specific cases, to the projection of the axis of symmetry of the tool since the central projection does not keep the proportions between distances. The axis of symmetry M1, M2 of the projection of a tool thus does not necessarily cross the projected insertion point O1, O2 associated with the tool. Processing unit 28 determines, for each pair of candidate pixels, whether the perpendicular bisector associated with the pair of candidate pixels cuts one of circles C1, C2. If so, this means that the perpendicular bisector, called candidate perpendicular bisector, is likely to correspond to an axis of symmetry. Processing unit 28 then implements a sorting method based on the Hough method described, for example, in the work entitled "Use of the Hough Transformation To Detect Lines and Curves in Pictures" by Richard O. Duda and Peter E. Hart, Communications of the ACM, Vol. 15(1), pp. 11-15, 1972. Each candidate perpendicular bisector associated with a projected insertion point, for example, point O1, is defined by a couple of parameters $(\rho,\alpha)$, where $\rho$ is the distance separating the candidate perpendicular bisector from projected insertion point O1 and $\alpha$ is the angle between the candidate perpendicular bisector and a privileged direction, for example, straight line (O1, $\vec{e}_u$). For a given candidate perpendicular bisector, $\rho$ can vary within interval [0, R1] and $\alpha$ can vary within interval [0, $2\pi$]. Interval [0, R1] is divided into adjacent sub-intervals [ai, ai+1], where i is an integer varying between 1 and N and where a1=0, aN+1=R1 and ai<ai+1. Similarly, interval [0, $2\pi$] is divided into adjacent sub-intervals [bj, bj+1], where j is an integer varying between 1 and M, and where b1=0, bM+1=$2\pi$ and bj<bj+1. An array T with N lines and M columns having its line of index i associated with sub-interval [ai, ai+1] and its column of index j associated with sub-interval [bj, bj+1] is then defined. Each element Ti,j of the array corresponds to a counter initially set to 0. For each candidate bisector, counter Ti,j associated with sub-intervals [ai, ai+1] and [bj, bj+1] which contain the parameters $(\rho,\alpha)$ associated with said candidate bisector is incremented. When all candidate perpendicular bisectors have been considered, processing unit 28 determines the indexes iMAX and jMAX of the highest counter TiMAX,jMAX. The axis of symmetry of the surgical tool associated with projected insertion point O1 can then correspond to the straight line defined by $\rho$=(aiMAX+aiMAX+1)/2 and $\alpha$=(bjMAX+bjMAX+1)/2.

Processing unit 28 also stores the pixel pairs which have taken part in the incrementation of each counter $T_{i,j}$. Straight lines $D_1$, $D_1'$ corresponding to the edges of the projection of the surgical tool associated with projected insertion point $O_1$ are defined based on the pixel pairs associated with counter $T_{iMAX,jMAX}$. To increase the number of pixels, processing unit 28 may add, for each pixel associated with counter $T_{iMAX,jMAX}$, a new pixel corresponding to the symmetrical of the pixel with respect to the axis of symmetry. The first edge of the tool projection can then correspond to straight line $D_1$ obtained by linear regression from the pixels located on one side of the axis of symmetry and the second edge of the tool projection can then correspond to straight line $D_1'$ obtained by linear regression from the pixels located on the other side of the axis of symmetry. The method is repeated for all the tools searched by the surgeon and then carries on at step 112.

At step 112, for each axis of symmetry $M_1$, $M_2$, processing unit 28 determines which pixels of the axis of symmetry belong to the tool. For this purpose, a pixel selection method based on Otsu's method which comprises assigning to each pixel a color class from among two color classes may be used. Otsu's method is, for example, described in the publication entitled "A threshold selection method from gray level histograms" by N. Otsu, IEEE Trans. Systems, Man and Cybernetics, Vol. 9, pp. 62-66, 1979. As an example, processing unit 28 determines, for all the pixels of the axis of symmetry, a histogram of a function H, representative of the color of the pixel, according to a number of levels or color classes which depends on the accuracy used for the coding of function H. A threshold is then defined according to Otsu's method. A first color class is then assigned to the pixels for which function H is smaller than the threshold, for example, the lowest color class in the histogram, and a second color class is assigned to the pixels for which function H is greater than the threshold, for example, the highest color class in the histogram. The pixels of the axis of symmetry then distribute into groups of adjacent pixels of the first or of the second color class. For each color class, the pixel group having the greatest number of pixels is then determined. To determine the color class which corresponds to the surgical tool and the color class which corresponds to the image background, it is considered that the pixel group of image 106 on the axis of symmetry $M_1$ closest to projected insertion point $O_1$ necessarily belongs to the tool associated with projection insertion point $O_1$. The color class associated with the tool is thus obtained. It is possible for step 112 to only be implemented for the first image provided by camera 17. For the images subsequently provided by camera 17, it can be considered that the tool corresponds to the pixel group having the largest number of pixels and associated with the color class of the previously-determined tool. The method carries on at step 114.

At step 114, processing unit 28 determines the position of the end of the projection of surgical tool 94, 95 on image 106, or tip $S_1$, $S_2$ of the tool. Tip $S_1$, $S_2$ corresponds to the end of the pixel group associated with the tool opposite to projected insertion point $O_1$, $O_2$. When tip $S_1$, $S_2$ thus determined is on an edge of image 106, this actually means that the tip of the tool is not visible on image 106. It may be necessary, to more finely determine the position of the tool tip, to consider in further detail the pixels of axis of symmetry $M_1$, $M_2$ around the tool tip and to apply color constraints thereto to determine whether, effectively, they belong or not to the tool. At the end of the surgical tool detection method, processing unit 28 thus has determined, for each surgical tool 94, 95 the axis of symmetry $M_1$, $M_2$, edges $D_1$, $D_1'$, $D_2$, $D_2'$, and tips $S_1$, $S_2$. The method carries on at step 102 for the processing of another image provided by camera 17.

The present invention enables implementing complex displacements commands by processing unit 28 for the displacement of positioning system 10 of camera 17. As an example, processing unit 28 may control positioning system 10 to displace endoscope 12 until tip $S_1$, $S_2$ of a specific surgical tool 94, 95 is at the center of image 106 provided by camera 17. For this purpose, the surgeon may provide a command of "center on identifier" type to processing unit 28 via voice control system 38. Processing unit 28 can then detect the tools present on the image provided by camera 17. If the tip of the tool corresponding to the identifier provided by the surgeon is present in the image, processing unit 28 then controls positioning system 10 to displace endoscope 12 so that the tool tip is at the level of a predefined central region of the image. If the tool corresponding to the identifier provided by the surgeon is present on the image but the tool tip is outside of the image, processing unit 28 is capable of controlling positioning system 10 to displace endoscope 12 towards the tool tip since the position of the insertion point associated with the tool is known. If the tool corresponding to the identifier provided by the surgeon is not present on the image, control unit 28 may control positioning system 10 to direct endoscope 12 towards the insertion point associated with the searched tool. The tool must then be on the image provided by camera 17 and the centering on the tool tip is performed as described previously.

Another control example comprises displacing endoscope 12 so that the tip of a surgical tool permanently is at the level of the central region of the image provided by camera 17. For this purpose, the surgeon may provide a command of "follow identifier" type to processing unit 28 via a voice control system 38. Processing unit 28 then controls positioning system 10 as described previously to center the image provided by camera 17 on the tip of the tool corresponding to the identifier provided by the surgeon. After, for each new image received by processing unit 28, unit 28 controls positioning system 10 to center back, if necessary, the image on the tool tip.

Another control example comprises controlling a "magnification" of the image at the level of the tip of a specific tool. For this purpose, the surgeon may provide a command of "zoom on identifier" type to processing unit 28 via voice control system 38. Processing unit 28 then controls positioning system 10 as described previously to align the image provided by camera 17 on the tip of the tool corresponding to the identifier provided by the surgeon. Processing unit 28 can then determine the distance between straight lines $D_1$, $D_1'$, $D_2$, $D_2'$ of edges associated with the considered tool at the toll tip and deduce therefrom a value representative of the image magnification. Processing unit 28 can then control positioning system 10 to displace endoscope 12 to increase or decrease such a magnification to reach a predetermined magnification or a magnification provided by the surgeon. According to a variation, camera 17 may comprise a zoom function. Processing unit 28 is then capable of controlling the zoom function of camera 17 based on the detection of the distance between straight lines $D_1$, $D_1'$, $D_2$, $D_2'$.

The duration of the processing of an image by processing unit 28 may vary from a few tens of milliseconds to some hundred milliseconds. Processing unit 28 can thus receive new images to be processed at a high frequency. The surgical tool detection method according to the present invention can thus be implemented in real time.

The present invention thus enables, during a surgical intervention, relieving the surgeon who does not have to systematically control each displacement of endoscope 12. Indeed, the previously-described controls enable the surgeon to focus his attention on the surgical intervention, while processing unit 28 simultaneously automatically controls the displacements of endoscope 12 according to the initial command given by the surgeon.

The present invention may also be implemented when the surgical tools are not cylindrical. The above embodiment may be readily applied to a tool having an elongated shape, its projection in a plane having rectilinear edges. Such is the case for a conical, prismatic, pyramidal shape, etc. More generally even for tools having more complex shapes, geometrical parameters characteristic of the tools may be stored in processing unit 28. Steps 108 to 114 of the previously-described tool detection method may then be adapted according to the geometrical parameters characteristic of each surgical tool.

Of course, the present invention is likely to have various modifications and variations which will occur to those skilled in the art. In particular, although the present invention has been described for surgical interventions, for which the video images are provided by a camera linked to an endoscope, the present invention may apply to any type of image provided by a medical imaging system. Such is the case, for example, for ultrasound images, fluoroscopic images, or scanner images. Further, although the present invention has been described for a specific positioning system example, it may apply to any type of positioning system.

What is claimed is:

1. A device for detecting a surgical tool in an image, said surgical tool going through an incision made in a patient's skin or one of patient's organs, the device comprising:
   means for storing shape parameters of the surgical tool;
   means for determining a position of a projection of the incision in an image plane; and
   means for analyzing the image and detecting, taking into account the shape parameters and the position of the projection of the incision, points and/or straight lines characteristic of the projection of the surgical tool in the image.

2. The device of claim 1, further comprising:
   means for acquiring the image; and
   means for calibrating said acquisition means.

3. The device of claim 1, further comprising:
means for determining the position of the incision with respect to the patient; and
means for determining the position of the projection of the incision in the image plane based on the position of the incision with respect to the patient.

4. The device of claim 1, further comprising:
means for acquiring first and second images of the incision;
means for determining a first position of a point of the projection of the incision on the first image and a second position of said point on the second image; and
means for determining the position of said point with respect to the patient based on the first and second positions.

5. The device of claim 1, wherein the surgical tool has an elongated shape, the lateral edges of the projection of the tool in the image plane corresponding to straight lines, and wherein the means for detecting points and/or straight lines characteristic of the projection of the surgical tool in the image is capable of:
determining a set of pixels of the image such that, for each pixel in the set of pixels, the gradient of a function which depends on the pixel color is greater than a threshold; and
selecting each pixel for which a straight line crossing the pixel and perpendicular to the gradient runs at the level of the projection of the incision in the image plane.

6. The device of claim 5, wherein the means for detecting points and/or straight lines characteristic of the projection of the surgical tool in the image is capable of:
determining the axis of symmetry of the projection of the surgical tool on the image from the selected pixels;
determining the pixels of the axis of symmetry belonging to the projection of the tool on the image; and
determining the pixel of the axis of symmetry corresponding to the end of the tool.

7. The device of claim 6, wherein the means for detecting points and/or straight lines characteristic of the projection of the surgical tool in the image is capable of:
determining, from among the selected pixels, a set of pixels such that, for each pair of pixels in the set of pixels, the perpendicular bisector of the pair runs at the level of the projection of the incision in the image plane;
classifying the perpendicular bisectors in groups of adjacent perpendicular bisectors; and
determining an axis of symmetry from the group of perpendicular bisectors containing the largest number of perpendicular bisectors.

8. The device of claim 6, wherein the means for detecting points and/or straight lines characteristic of the projection of the surgical tool in the image is capable of:
assigning to each pixel of the axis of symmetry a color class from a first or a second color class;
selecting a first group of adjacent pixels containing the larger number of adjacent pixels of the first color class and a second group of adjacent pixels containing the largest number of adjacent pixels of the second color class; and
selecting, from among the first or the second group of pixels, the pixel group closest to the projection of the incision in the image plane.

9. A device for controlling a positioning system having means for acquiring images of a patient in whom at least one incision has been made to let through a tool, the control device comprising:
means for providing instructions transmitted by a user;
a detection device comprising:
means for storing shape parameters of the surgical tool;
means for determining a position of a projection of the incision in an image plane; and
means for analyzing the image and detecting points and/or straight lines characteristic of a projection of a surgical tool on the image taking into account the shape parameters and the position of the projection of the incision; and
means for providing control signals to the positioning system based on the points and/or straight lines characteristic of the surgical tool provided by the detection device and on the instructions provided by the means for providing instructions.

10. The device of claim 9, wherein the image acquisition means comprises an endoscope and a camera.

11. A method for detecting a surgical tool in an image, said tool going through an incision made in a patient's skin or in one of patient's organs, the method comprising the steps of:
storing shape parameters of the surgical tool;
determining the position of the projection of the incision in the image plane; and
analyzing the image and detecting points and/or straight lines characteristic of the projection of the surgical tool on the image taking into account the shape parameters and the position of the projection of the incision.

12. The method of claim 11, wherein the step of determining the position of the projection of the incision in the image plane comprises the steps of:
determining the position of the incision with respect to the patient; and
determining the position of the projection of the incision in the image plane from the position of the incision with respect to the patient.

13. The method of claim 11, wherein the step of determining the position of the projection of the incision in the image plane is carried out via image acquisition means, the method comprising a prior acquisition means calibration step.

14. The method of claim 11, wherein the surgical tool has an elongated shape, the lateral edges of the projection of the tool in the image plane corresponding to straight lines, the method further comprising the steps of:
determining a set of pixels of the image so that, for each pixel in the set of pixels, the gradient of a function which depends on the pixel color is greater than a threshold; and
selecting each pixel for which the straight line crossing the pixel and perpendicular to the gradient runs at the level of the projection of the incision in the image plane.

15. The device of claim 1, wherein the analyzing means is configured to:
determine, taking into account the shape parameters, candidate sets of pixels likely to correspond to points and/or lines characteristic of the projection of the surgical tool in the image; and
select pertinent ones of the sets of candidate pixels taking into account the position of the projection of the incision.

* * * * *